Feb. 7, 1961  R. H. HOGE  2,970,611
VALVE APPARATUS AND CONTROLS
Filed Aug. 6, 1956  3 Sheets-Sheet 1

INVENTOR
ROBERT H. HOGE

BY  *Harry P. Canfield*

ATTORNEY

Feb. 7, 1961 R. H. HOGE 2,970,611
VALVE APPARATUS AND CONTROLS
Filed Aug. 6, 1956 3 Sheets-Sheet 3

INVENTOR
ROBERT H. HOGE

BY 
ATTORNEY

United States Patent Office 2,970,611
Patented Feb. 7, 1961

2,970,611

VALVE APPARATUS AND CONTROLS

Robert Hatcher Hoge, Gates Mills, Ohio, assignor to The Clark Controller Company, Cleveland, Ohio, a corporation of Ohio Filed Aug. 6, 1956, Ser. No. 602,212

15 Claims. (Cl. 137—620)

This invention relates to valve apparatus of the class in which valves are operated to supply fluid under pressure from a source to an apparatus to be served or operated; and are restored to cut off or exhaust the supply of pressure; and in which the valves thus operate and restore in response to control signals transmitted thereto.

In the various arts, the apparatus to be pressure-served by valve apparatus of this class is often of such nature that the valve apparatus when signalled, to operate or to restore as referred to, must do so infallibly, and therefore safely, because otherwise damage to the pressure-served apparatus or injury to personnel attending it may result.

An illustrative example of such a pressure-served apparatus is a cyclically operating motor driven machine having a clutch and brake, operated to engage the clutch and release the brake to start the machine, and to release the clutch and set the brake to stop it, by reciprocations of a piston in a cylinder, when pressure is respectively applied to and exhausted from the cylinder; and an air valve device is operated and restored, respectively, to communicate air pressure to and exhaust it from the cylinder, in response to signals to the device from a manual or machine operated control.

In such an example it is particularly important that the valve device shall exhaust the cylinder to stop the machine when signalled to do so, to be safe as referred to.

Controls for the valve devices of such machines for the purposes mentioned have been developed to a high degree of safety, illustrative of which is the power press control described in Patent No. 2,133,161, and valve devices per se comprising valves operable to admit air pressure to and exhaust it from a cylinder adaptable to such machines have been developed that operate responsive to control signals with a high degree of infallibility, illustrative of such valve devices being that described in the copending patent application of Jan R. Ohlsson, Serial Number 417,795 filed March 22, 1954 (assigned to the instant assignee) and which issued into U.S. Patent Number 2,902,052 on September 1, 1959.

It is known however that such valve devices, no matter how infallible they may be in responding to actuating signals when first made and installed, are, in use, subject to deterioration from wear and tear, mechanical fatigue of materials, infrequent or careless inspection and maintenance, etc. and after a period of use the reliability carefully built into them are no longer sufficient to prevent faulty operation or failure of signal response, and they cease to be completely safe in the respects above noted.

An object of the invention is to provide a valve apparatus adaptable for use with control systems that have been developed to a high degree of safety in operation as referred to, and which valve apparatus will have as high a degree of infallibility and safety as the control systems.

Another object is to provide a valve apparatus for supplying pressure to a served apparatus and for cutting off or exhausting the pressure from the apparatus, which when signalled so to do by a control, will do so with a degree of reliability and infallibility nearer to absolute infallibility than has heretofore been possible.

The invention is applicable to various uses in the several arts. Since its use to serve the clutch and brake air cylinder of a cyclically operating machine as referred to, is one of its more important uses, and in order to describe herein concretely at least one of its uses, as required by law, it has been chosen to describe it herein as supplying air under pressure to an air cylinder and piston servo device, and exhausting it therefrom.

The invention may be embodied in various forms, but in the form described herein it comprises, in general, two valve devices adapted to be connected in series between a supply source of air pressure and the said air cylinder. Each valve device comprises valve ports; and respective valves reciprocable to two positions; which may be referred to as effecting an "on" condition and an "exhaust" condition of the devices. With both devices in the on condition, air is supplied from the source through both valve devices in series to the air cylinder. If either device goes from the on condition to the exhaust condition, it exhausts air from the cylinder.

Normally, a first one of the valve devices is always maintained in the on condition; and the second one is operated alternately to on condition and exhaust condition to supply pressure to and exhaust it from the air cylinder when signalled to do so by a control, preferably electromagnetic.

If because of the development of a fault, or failure to perform its function, the said second valve device fails to go to exhaust condition when signalled so to do, the first device is automatically caused to go to exhaust condition and exhaust the cylinder; and is thereafter maintained in exhaust condition until the second device is replaced or repaired to correct the fault or failure, and safety in the respects above referred to, is thereby provided by the first device.

The valves of both devices are reciprocable as referred to by diaphragms connected to them and by the difference of effective air pressures communicated to opposite sides of the diaphragms and the air pressure acting on the valves.

To move the first valve device to, and normally hold it continuously in on condition as referred to, pressure from the source is communicated to one side of its diaphragm, and pressure is exhausted from the other side; and when, in the event of any fault or failure, the second valve device fails to go to exhaust condition, pressure is automatically communicated to the said other side of the diaphragm of the first device in a manner to cause the diaphragm to move the valve device to and hold it in exhaust condition.

The means by which the first valve device is held normally in on condition and is caused to go to exhaust condition upon failure of the second valve device to do so on signal, comprises operating parts which perform functions that insure certain and stable functioning of the first device, thus insuring the safety provided for by the first device as aforesaid; and in the event that said operating parts themselves should fail to perform their functions, means is provided by which the first valve device is rendered responsive to such failure and goes to exhaust condition, and thereby the said safety is further insured.

Another object of the invention is to provide a valve apparatus having the features and characteristics of operation set forth in the foregoing general description.

From the foregoing, it will be seen that the said first valve device, by being maintained always in on condition during normal pressure supply and exhaust operations of the second valve device, is not subjected to wear and tear and deterioration, so that when called upon to go to exhaust condition will be in effect a fresh new valve device and will therefore safely perform.

It is therefore another object of the invention to provide generally a valve apparatus having two valve devices in series between a source of pressure and an apparatus to be served, a first one of which is normally maintained in an air flow or on condition and the second of which is alternately operable to an on condition to supply air pressure to a served apparatus and to an exhaust condition to exhaust the apparatus in response to signals communicated thereto; both valve devices being operable to go to on condition or to exhaust condition by a difference of air pressure applied thereto, and the first device automatically going to exhaust condition upon failure of the second one to do so in response to signal.

An illustrative embodiment of the invention is fully disclosed in the following description taken in connection with the accompanying drawing.

The actual invention is that set forth in the appended claims.

The invention as described herein may be considered as embodying improvements in the subject matter of patent application Serial Number 490,080 filed on Feb. 23, 1955, which issued into U.S. Patent Number 2,909,193 on October 20, 1959.

In the drawing:

Figs. 2 to 7 are views showing separately a valve spool of Fig. 1, of which:

Figs. 10-11-12 are views of a valve of Fig. 1 to enlarged scale of which:

Figure 1:
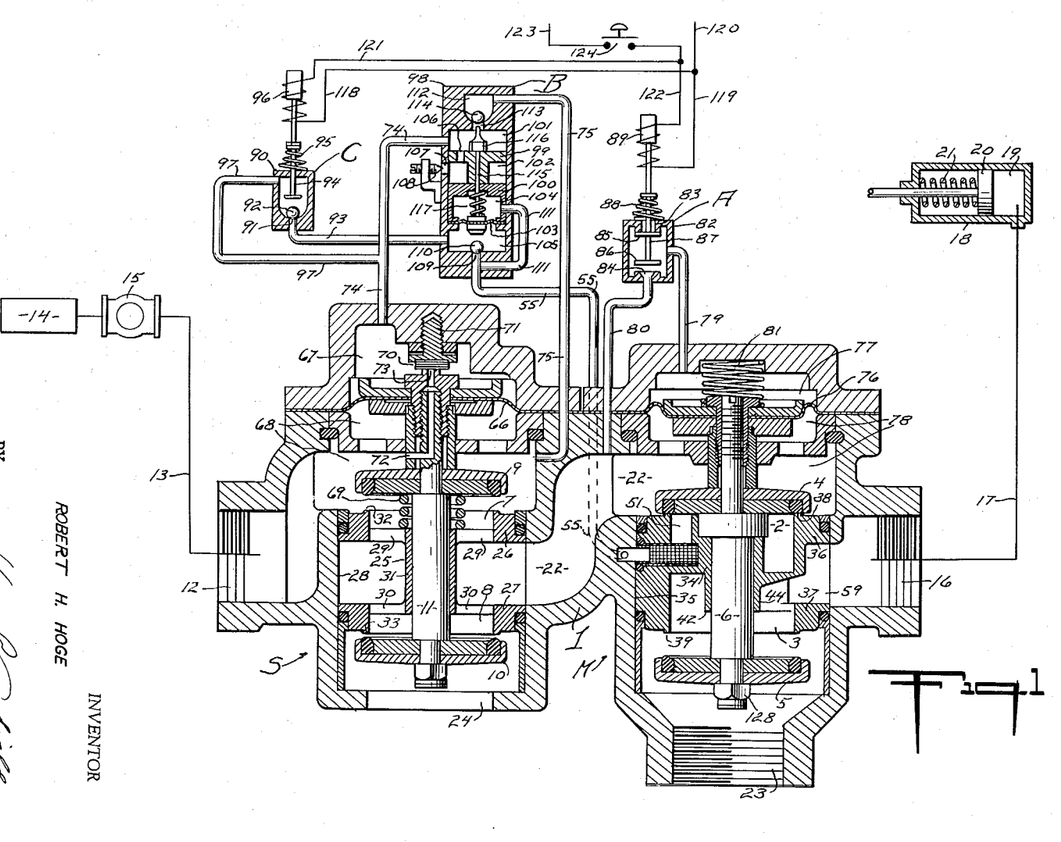
Fig. 1 is a view in some respects diagrammatic, illustrating an embodiment of the invention, with apparatus parts thereof in section.
Figure 2:
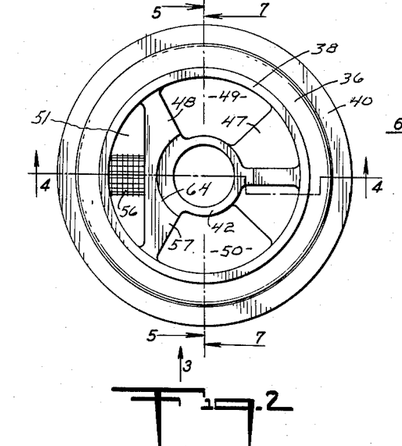
Fig. 2 is a top plan view.

Referring to the drawing Fig. 1 there is shown at 1 a valve housing, preferably of cast metal, in which is a main valve device M and a protector or safety valve device S.

The valve device M has upper and lower valve ports 2—3 indicated in Fig. 1 but best shown in Figs. 2 to 7 to be described; and corresponding valves 4—5, connected by a stem 6.

The valves 4—5 in operation to be described move in unison to the down position illustrated in Fig. 1 to close port 2 and open port 3, or to an up position to close port 3 and open port 2.

The valve device S similarly has upper and lower ports 7—8 and valves 9—10 connected by a stem 11, which, in operation move in unison to down position to close port 7 and open port 8, or to the up position to close port 8 and open port 7. Valve device S of Figure 1 is shown in the ready condition, which is the position of the valve when no air pressure has been admitted to it.

The housing 1 has an inlet 12, threaded to be conduit-connected, as indicated by the line 13, to a supply source 14 of air pressure, through a manually operable supply valve 15; and the housing has an outlet 16, threaded to be conduit-connected, as indicated by the line 17, to an apparatus 18 to be served by air pressure; and which for illustrative purposes is the brake cylinder 19 of a power press as referred to in the premises, containing a piston 20 which is moved forward by air pressure applied to the cylinder behind it from the line 17 to release the press brake, and returned by a spring 21 to set the brake upon interruption or exhaust of the applied pressure.

The valve devices S and M are in series in the order named, between the pressure source 14 and the apparatus 18; and when the valves of both devices are in the up position, air under pressure goes from the inlet 12, by way of port 7, through a connecting passageway 22 formed in the housing 1, by port 2 to outlet 16 and to the apparatus 18; and when the valves of either device M or S, are in the down position, air at the apparatus 18 may exhaust therefrom; the exhaust at device M being back through line 17 and outlet 16, and through port 3 and an exhaust outlet 23; and if the valves of device M are in the up position at the time, and the valves of device S alone are in the down position, exhaust occurs at the device S back by way of outlet 16, valve port 2, passageway 22, port 8, through an exhaust outlet 24.

The flow of supply air and exhaust air through the valve devices S and M as referred to, is directed by valve spools as follows.

In the device S, Fig. 1, is a valve spool 25 comprising axially spaced annular heads 26—27 fitted in a bore 28 of the housing 1, and connected by spokes 29—29 and 30—30 to an axial tubular guide 31 in which the stem 11 is guided; and the annular form of the heads provides the valve ports 7—8; and the heads have elevated annular valve seats 32—33 thereon.

Supply air from the inlet 12 flows downwardly through the port 7 and between the spokes 29 to passageway 22; and exhaust flows from the passageway 22 downwardly between the spokes 30—30 and through the port 8.

At the device M is a valve spool 34 fitted in a bore 35 of the housing, and which, because of the air supply and exhaust paths through it, is shown separately in Figs. 2 to 7.

The spool 34 has spaced annular heads 36—37 and elevated annular valve seats 38—39 thereon, the annular form of the heads providing the ports 2—3.

Figure 5:
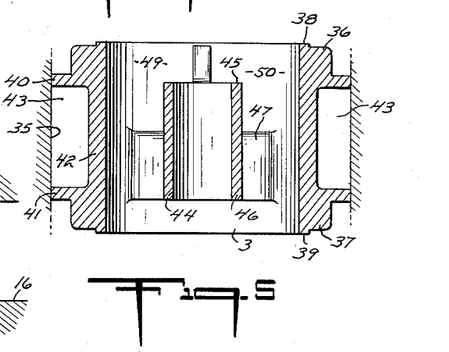
Fig. 5 is a sectional view from the plane 5—5 of Fig. 2.
Figure 6:
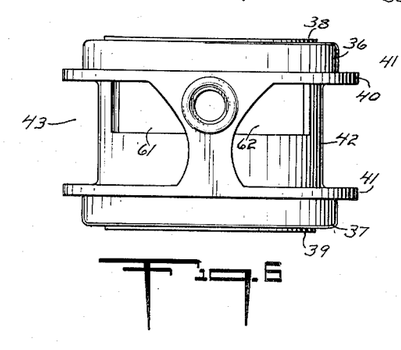
Fig. 6 is an elevational view in the direction of the arrow 6 of Fig. 3.
Figure 7:
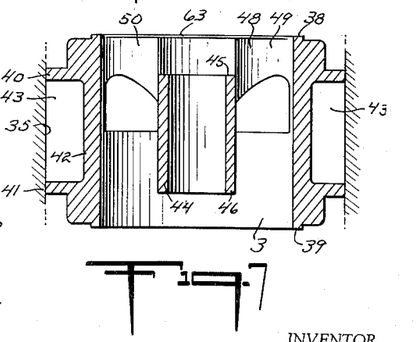
Fig. 7 is a sectional view from the plane 7—7 of Fig. 2.

The heads 36—37 have annular flanges 40—41 there around, which are the parts of the spool that fit in the bore 35; and the heads 36—37 are connected, in general, by a tubular wall 42, shown best in Figs. 5, 6 and 7; thus providing, in general, an annular passageway 43 around the outside of the wall 42.

At the axis of the spool is a tubular guide 44 in which the valve stem 6 is reciprocably guided; the ends 45—46 of the guide being axially inward of the valve seats 38—39.

The tubular guide 44 is connected to the inside of the wall 42 by spoke portions 47 and 48, at opposite sides of the guide, thus providing flow passages 49—50 from end to end of the spool around the spoke portions.

The spoke portion 48 is formed to provide an upwardly open pocket 51. A bore 52 extends outwardly laterally from the inside of the pocket 51, see Fig. 4, and its open end communicates with a recess 53 in the main housing 1, and the end of the bore 52 is sealed with respect to the recess 53 by a sealing ring 54.

A control conduit 55, to be referred to, communicates with the recess 53.

A tubular air filter screen 56 is telescoped into the bore 52.

As will be described, air flows down in the pocket 51 and thence to the control conduit 55 and is kept clean by the filtering screen 56.

The top side of the spoke portion 48 has a planar surface 57 parallel to the valve seat 38 and at a small distance below the level thereof which as an illustrative example may be .020". The valve 4 is constructed, as will be described, to be planar on its under side.

When the valve 4 is on the seat 38 there is thus provided a thin slit 63 between the valve and said surface 57, and in practice this may be made to be as referred to .020" thick.

Figure 4:
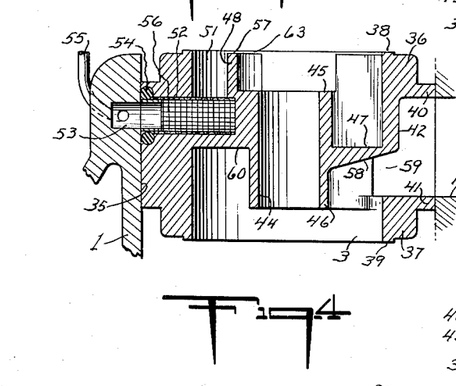
Fig. 4 is a sectional view from the plane 4—4 of Fig. 2.

The spoke portion 47 terminates downwardly at 58 Fig. 4 about midway between the flanges 40—41 and the spool side wall 42 has an opening 59 therethrough under the spoke portion 47, which opening is opposite to and communicates with the outlet 16.

Figure 3:
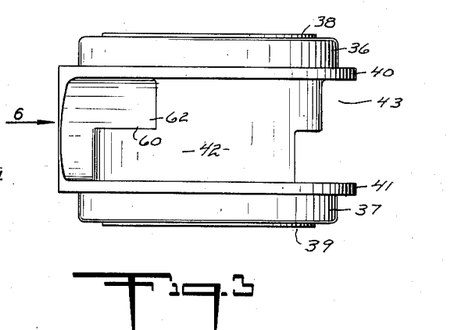
Fig. 3 is an elevational view in the direction of the arrow 3 of Fig. 2.

The spoke portion 48 terminates downwardly at the underside of the pocket 51 at 60 Figs. 3 and 4, and at each side of the pocket 51 the side wall 42 has openings therethrough 61—62 Figs. 3 and 6.

When the valves 4 and 5 are in the up position opening port 2 and closing port 3, and with the passageway 22 subjected to source pressure through the valve devices as described, air under pressure flows from the passageway 22 above the port 2, downwardly through the passages 49—50, around and under the spoke portion 47 and out at the opening 59 to the outlet 16; and also flows downwardly through these passages to the inside of the tubular wall 42 and out through the openings 61—62 to the annular passageway 43 and around in it to the outlet 16.

Air under pressure also flows from the passageway 22 into the top of the pocket 51 and out to the recess 53 and control conduit 55 subjecting the latter to pressure.

When the valves 4—5 are in the down position opening port 3 and closing port 2, exhaust air from the apparatus 18 flows in at the outlet 16, through the opening 59 and down through the port 3 to exhaust outlet 23; and exhaust air also flows from the outlet 16 into the annular passageway 43 and around in it to the openings 61—62 and thence into the inside of the tubular wall 42 and thence down through the port 3 and out at the outlet 23. Also, pressure in the control conduit 55 as referred to is relieved by flowing upwardly through the pocket 51 and through the slit 63 to the passages 49—50 and down and out at the open port 3.

Figure 8:
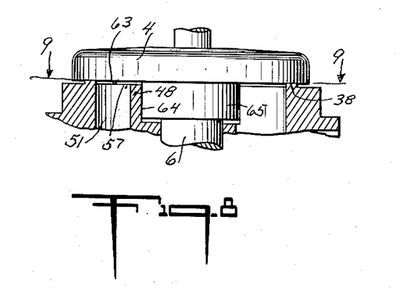
Fig. 8 is a fragmentary view of a part of Fig. 1 to enlarged scale.
Figure 9:
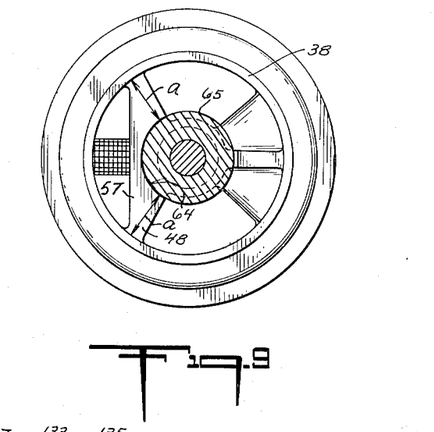
Fig. 9 is a sectional view from the plane 9—9 of Fig. 8.

The aforesaid slit 63 between the underside of the valve 4 and the planar surface 57 is illustrated in Figs. 8 and 9.

The spoke portion 48 having the said planar surface 57 thereon, has a part cylindrical recess 64 therein, concave toward the valve stem 6. On the underside of the valve 4 is a thick disc 65 which fits the concave recess.

Flow over the surface 57 and through the slit 63 is thus diverted by the disc 65 and confined to flow over portions of the surface 57 of limited radial extent indicated at a in Fig. 9, in effect throttling the flow.

This throttling effect is utilized operatively in a particular instance to be described, when the valve 4 is held, abnormally, from completely closing the port 2, by extraneous matter lodged between the valve 4 and its valve seat 38; pressure above the valve then flowing inwardly under the valve and across the planar surface 57 through the slit 63 and being throttled at the surface portions a creates pressure in the pocket 51 and in the control conduit 55, and is utilized for safety purposes in a manner to be described.

In view of the premises, the valves 9—10 of the device S, during normal operation, are always in the up position, and the valves 4—5 of device M are operated up and down, repeatedly, to successively apply pressure to the apparatus 18 and exhaust it therefrom.

The means for operating the valves to this end will now be described.

In the device S, the stem 11 is connected to a diaphragm 66, which divides a part of the main housing into upper and lower pressure chambers 67—68. The source pressure in the inlet 12 is always communicated to the lower chamber 68 and to the underside of the diaphragm 66, as is apparent in the drawing.

The stem 11 and valves 9—10 are normally held in their ready positions as illustrated, by a compression spring 69 reacting between the underside of the valve 9 and the upper end of the spool 25.

The stem 11 goes up through the diaphragm 66, and the spring 69 is made of suitable strength to balance the weight of the stem and its valves and engage the upper end of the stem with a cushioning pad 70, of rubber or similar material.

The pad 70 is adjustable up and down, by being mounted on a holder 71 screw threaded into the housing; and is adjusted so that when the upper end of the stem 11 is touching it, the lower valve 10 will not quite close the port 8, as shown, and so that when the lower valve 10 is moved up to fully close the port 8, the end of the stem 11 will be firmly pressed upon the pad 70.

A duct 72 leads from the lower pressure chamber 68 laterally into the stem 11 and then upwardly axially through it; and has an outlet 73 at its upper end arranged to be closed and sealed on the pad 70, when the stem 11 is in its up position closing the port 8; and the duct 72 communicates with the upper chamber 67 when the stem 11 moves downwardly, and opens the duct outlet 73.

A conduit 74 communicates with the upper chamber 67, and a conduit 75 communicates with the lower chamber 68.

At the device M, the stem 6 is connected to a diaphragm 76 which divides a part of the housing into upper and lower pressure chambers 77 and 78. Pressure in the passageway 22 is always communicated to the underside of the diaphragm 76 as is apparent in the drawing.

A conduit 79 communicates with the upper chamber 77 and a conduit 80 communicates with the lower chamber 78.

The stem 6 and valves 4—5 are normally held in their down positions by a compression spring 81 reacting between the upper side of the diaphragm 76 and the housing, and by gravity augmented by the spring.

At A, B and C are devices constituting part of the means for controlling operation of the valve devices S and M as referred to.

These devices in practice may be assembled with the main housing, and certain conduits connected thereto may then take the form of ducts formed in the housing; but to simplify this disclosure, these devices are shown separately in the drawing; and will now be described.

The device A is an electromagnetic valve device. It comprises a walled housing 82; an upper air exhaust port 83 from the housing; a lower air inlet port 84 to the housing; valves 85 and 86 connected to a stem 87 and reciprocable up and down in unison, to open one port and close the other, and normally held up by a spring 88 to normally close the port 83 and open the port 84 as illustrated; and movable down by an electromagnet 89.

The valve port 84 communicates with the lower chamber 78 of the device M by the said conduit 80; and the interior of the housing 82 communicates with the upper chamber 77 of the device M by the said conduit 79.

The device C is an electromagnetic valve device. It comprises a walled housing 90; a lower air inlet valve port 91 and a ball check valve 92 normally closing the port 91 by gravity; a conduit 93 communicating with the valve port 91 below the ball 92; a valve stem 94 having its lower end normally held above the ball 92 by a spring 95 to allow the ball to be raised to open the port, by pressure in the conduit 93, and movable downwardly by an electromagnet 96 to hold the ball down to keep the port closed against pressure in the conduit 93.

A conduit 97 communicates with the interior of the housing 90 and with the said conduit 74.

The device B is an air operated valve device. It comprises a housing 98 having two transverse walls 99 and 100 dividing the upper part of the housing interior into chambers 101 and 102; and a diaphragm 103 dividing the lower part into upper and lower pressure chambers 104 and 105.

The aforesaid conduit 74 communicates with the chamber 101; and the wall 99 has an orifice 106 therethrough between the chambers 101 and 102 and the chamber 102 has an outlet orifice 107 to atmosphere therefrom, the effective size of which is adjustable by a needle valve 108.

The aforesaid conduit 93 communicates with the lower pressure chamber 105.

The lower pressure chamber 105 has an inlet valve port 109 normally closed by a check valve ball 110 by gravity; and the port 109 communicates with the aforesaid conduit 55.

A conduit 111 connects the upper pressure chamber 104 with the conduit 55 below the port 109.

At the top of the housing 98 is a check valve chamber 112 having a port 113 communicating with the chamber 101, and normally closed by a gravity check valve ball 114. The said conduit 75 connects the valve chamber 112 with the lower chamber 68 of the device S.

A stem 115 is connected to the diaphragm 103 and extends upwardly through the walls 99—100 and has a head 116 above the upper wall 99 and the head has an upwardly pointed end below the ball 114. A compression spring 117 reacting between the diaphragm 103 and the wall 100 above it, normally holds the diaphragm and stem down and holds the head 116 down upon the upper wall 99 to let the ball 114 close the port 113; and upon upward movement of the diaphragm 103 to be referred to, the head raises the ball 114 to open the port 113.

The windings of the electromagnets 96 and 89 have one of their terminals connected by wires 118 and 119 to one current supply line 120; and the other terminals connected by wires 121 and 122 to the other current supply line 123 through a contactor 124, shown as an operator's push button contactor.

When the valves of the devices S and M are moved to close their ports, for example, when the valve 5 of device M is moved upwardly to close the port 3, it is propelled by the great force of the air pressure in the chamber 78 acting on the diaphragm 76 which may in practice be as high as 100 pounds per square inch, and it will engage its valve seat 39 with a blow; and if it engaged the seat at metal to metal contact as is usual in valve of this type, it would rebound from the seat and not instantly seal thereon, and would produce shock waves throughout the structure; and would rapidly wear and deteriorate and soon cease to make a perfect seal.

In view of the general end result of safety, sought to be accomplished by the invention, as in the premises, a perfect seal substantially without rebound must be made at all of the valves when they close, and continue to be made during a long period of use.

To this end, it is obvious that an annulus of rubber or like cushioning material could be bonded upon the annular valve seat or upon the valve to take the blow of closing, but such expedient has been found to be unsatisfactory because the hammer-like blows on the annulus soon render it useless. This problem has been solved by the construction of the valve as shown separately in Figs. 10 to 12.

Figure 10:
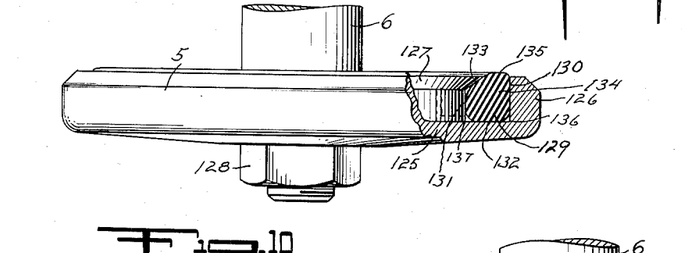
Fig. 10 is an elevational view with part broken away and in section.

Fig. 10 is a reproduction of the lower valve 5 of the device M to a larger scale, and the same construction is used for the other valves.

The valve comprises an outer part 125 of upwardly open cup-form having a skirt 126; and an inner part 127 of disc form, smaller than the skirt 126; the two parts being clamped together concentrically upon the end of the stem 6 by a nut 128, providing an annular pocket 129 therebetween.

The pocket 129 has a coaxial cylindrical wall 130 on the skirt; an opposite coaxial cylindrical wall 131 on the inner part; and a flat bottom wall 132 on the outer part; and is thus rectangular in cross-section; and the inner part 127 has a lip 133 overhanging the pocket.

Figure 12:
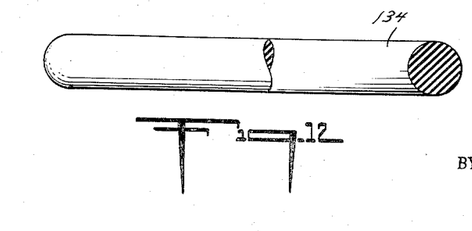

An annulus 134 or O-ring, of rubber-like resilient material shown separately in Fig. 12, and normally of circular cross-section, is placed in the annular pocket 129 before the parts are clamped together; and is large enough in cross-section so that it will be under compression in the pocket and will be tightly engaged with the rectangular walls 130, 131 and 132 of the pocket and be extruded outwardly above the skirt 126 and inner part 127 as shown at 135; and will be retained in the pocket by the lip 133.

It will be noted that the round form of the O-ring and the rectangular form of the pocket, leaves annular generally triangular spaces 136—137 under the O-ring.

Figure 11:
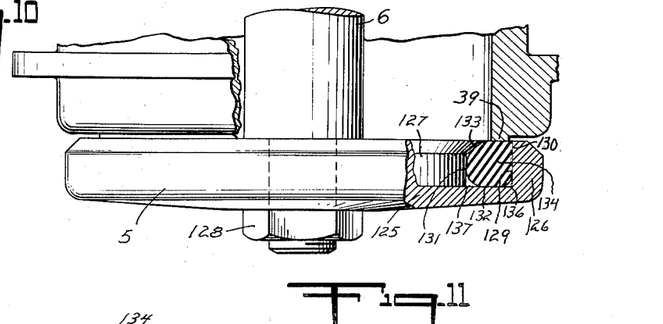
Fig. 11 is a view of the parts of Fig. 10 shown in association with a valve seat; and, Fig. 12 is a view showing separately, generally in elevation and partly in section, an O-ring constituting part of Figs. 10 and 11.

When the valve is moved to close its port, it is the annular extruded portion 135 of the O-ring that engages and seals upon the valve seat 39 as shown in Fig. 11.

The whole mass of the O-ring, and not the extruded contacting portion 135 alone, is subjected to the blow of impact upon initial engagement of the extruded portion 135 with the metal valve seat 39; and the O-ring yields by being compressed and distorted into the triangular spaces 136—137 of the pocket, thereby cushioning the impact and preventing shock as referred to; and by resisting compression under the continued force holding the valve toward its seat, maintains a perfect seal with the seat.

In effect, the O-ring as a whole retreats into the pocket due to compression, upon initial impact with the valve seat, and then expands outwardly after impact, thus being maintained at all times compressed upon the valve seat without rebound of the valve therefrom.

The extruded part 135 on which seal with the valve seat is made, has no metal immediately under it and therefore is not subjected to a hammering or forging action between metal of the valve and metal of the valve seat, which, if present, would cause it to rapidly deteriorate.

The O-ring can readily be removed and replaced as will be apparent; whereas in valves having a rubber or like annulus bonded upon a metal valve, the whole valve must be replaced at excessive cost.

Because of its long life wearing property combined with a suitable degree of resilience, the material of the O-ring is preferably the material known commercially as "Teflon."

*Normal operation*

The normal operation of the invention is described in the following description, simplified by reference to the premises in which the end results sought to be attained have already been set forth.

The movable parts of Fig. 1 are illustrated in their out-of-use positions, with supply valve 15 closed.

The valve devices A, B and C are in the illustrated, normal positions.

The valve device S as shown is in the ready condition.

The valve stem 11 and valves 9—10 thereof are held up by the spring 69, and the outlet 73 at the upper end of the duct 72 is just touching the pad 70, and the lower valve 10 is not quite touching its valve seat 33.

When the valve 15 is opened, air from the supply 14, flows in at the inlet 12 through the open port 7 to the passageway 22 and also into the lower pressure chamber 68 of valve device S, subjecting them to pressure.

The upper chamber 67 of device S has an open exhaust by way of conduit 74, chamber 101 of device B, and orifices 106 and 107, and therefore the pressure in chamber 68 moves the diaphragm 66 up and with it the valve stem 11 and valves 9—10, fully seating the valve 10 and sealing the port 8, and pressing the outlet 73 of duct 72 firmly upon the pad 70 to seal the outlet.

Air under pressure will also flow into conduit 75 and chamber 112 of device B and is stopped by check valve ball 114 firmly seating on port 113, closing it.

The valve device M is in the down condition illustrated, with the valves 4 and 5 closing port 2 and opening port 3, and the passageway 22 communicates with the lower chamber 78 of valve device M, and subjects it to pressure.

The lower chamber 78 of device M is in communication with the upper chamber 77 by way of conduit 80, open port 84 of device A, and conduit 79; and both chambers are therefore subjected to the same pressure; but the effective area of the diaphragm 76 in chamber 77 being greater than that in chamber 78, the device M is held in the illustrated down condition by pressure. Also, the pressure in chamber 78 will exert a downward force on the top of valve 4 to aid in holding device M in the down direction.

The apparatus 18 to be served is exhausted by way of conduit 17, inlet 16 of device M, and out by open port 3 and outlet 23.

The parts are now ready to serve the apparatus 18.

To supply pressure to the served apparatus 18, the valve devices A and C are simultaneously electrically energized by closing the contactor 124 and both go simultaneously to down condition.

At the device A, port 83 opens and port 84 closes.

Pressure exhausts from upper chamber 77 of device M by conduit 79 and now open port 83, and pressure is maintained in lower chamber 78 of device M at now closed port 84.

Pressure in chamber 78 of device M moves the diaphragm 76 up, raising the valves 4 and 5, to open port 2 and close port 3.

Exhaust from the apparatus 18 is cut off at the port 3 and pressure is given to it from the source 14, through port 7 of device S, passageway 22, port 2 of device M and outlet 16.

Upon opening of contactor 124, both devices A and C go back to up condition; and the device A again equalizes the pressures in the upper and lower chambers 77 and 78 of device M; and device M again restores to down condition, cutting off supply to the apparatus 18 at port 2 and opening its exhaust at port 3.

When the device M went to up condition as referred to upon opening port 2, pressure in the chamber 78 is communicated downwardly through the port 2 and into the aforesaid pocket 51; and thence to control conduit 55, and thence to lower chamber 105 of device B, and also from conduit 55 by conduit 111 to upper chamber 104 of device B, equalizing the pressures therein.

Pressure in chamber 105 is communicated by conduit 93 to port 91, of device C and is there blocked off by the check ball 92, since the device C is at this time in the operated or down condition. Pressure in both chambers 104 and 105 of device B being equal, device B remains unoperated. Thus no function is performed by pressure in conduit 55 under the conditions obtaining.

When device M restores to its down condition and exhausts the apparatus 18; the pressure in chamber 104, conduit 111, control conduit 55 and pocket 51 is exhausted by way of slit 63, spool 34 and open port 3.

The pressure in chamber 104 and conduit 93 cannot be exhausted in this manner because of its holding check valve ball 110 on port 109 to close it. However, device C has moved back to its up condition allowing the pressure in conduit 93 to raise check ball 92 and open port 91. The air will then flow through device C, conduit 97, conduit 74, chamber 101, orifice 106, chamber 102 and be exhausted out orifice 107. Some of the air flowing in conduit 74 will flow into chamber 67 of device S. This amount of air will be insufficient to cause device S to go to its down condition because of the limited initial amount flowing and the air that does flow into chamber 67 will soon be exhausted through the aforedescribed exhaust path.

Thus in view of the premises, upon closing contactor 124, a brake cylinder and piston of a press represented by the apparatus 18 may be operated to release the brake to allow the press to start; and upon opening contactor 124, may be restored to set the brake to stop the press; and the contactor 124 may be closed and opened by a control system for the press as described in said patent.

*Provisions insuring safe operation*

As set forth in the premises, for safe operation, the apparatus 18 must exhaust infallibly when the valve apparatus is signalled to exhaust upon opening of the contactor 124 as described.

This exhaust is effected as described at the valve device M, but if it should fail to exhaust, the valve device S, according to the invention will do so; and the devices A, B and C are incorporated in the apparatus of Fig. 1 to insure that valve devices M and S will perform as intended.

In the following are described faults which possibly can be present or develop in use, in the apparatus of Fig. 1, and the failure of function thereof; and how they are automatically prevented from causing unsafe operation of the served apparatus 18, by preventing supply of pressure to it in the first place, or by causing the apparatus 18 to exhaust and thereby go to safe condition in spite of such faults or failures, and to remain in exhaust condition until the fault is corrected.

The device M is normally in safety down condition as described; and if due to any fault or failure, for example in the described electric signal circuits, or in the device A, or in the diaphragm 76 etc., device M should fail to go to up condition when signalled to do so by closing the contactor 124, it will remain in down condition which is inherently safe.

Again, the devices A and C may function normally and go to down-condition, upon closing contactors 124, and thereby signal the device M to go to up-condition, and it may do so and give pressure to the apparatus 18; and the devices A and C may restore and go to up-condition upon opening of contactor 124, and thereby signal the device M to go to down-condition and exhaust the apparatus 18; but the device M, due to some fault, may fail to do so and remain in up-condition and not exhaust the apparatus.

In view of the premises, this failure of device M will be recognized as the most dangerous of all possible failures.

In such event, the device S as will now be described, will go to down condition and safely exhaust the apparatus back through port 2 of device M, passageway 22, and port 8 of device S, and prevent pressure from being again supplied to the apparatus 18 until the fault of the device M is corrected.

The valve 4 of device M being in up position the conduit 55 is under pressure and has communicated the pressure to the conduit 93 and port 91 of device C as described; and since the latter has gone to the up condition, the pressure in conduit 93 raises the check ball 92 and is communicated by conduit 97 to conduit 74 and thence into the upper chamber 67 of device S.

The chamber 67 has an exhaust by conduit 74 but it is restricted at the valve 108 as described, so that unrestricted pressure supplied from the conduit 97 accumulates in the chamber 67; and is applied on the diaphragm 66; and being on a greater effective area of the diaphragm than the pressure in the lower chamber 68, moves the diaphragm down. The movement of diaphragm 66 downward is aided by pressure in spool 25 exerting a downward force on valve 10.

Initial movement of the diaphragm removes the duct outlet 73 from the sealing pad 70 and immediately air under pressure flows upwardly through the duct 72 into chamber 67, augmenting that from conduit 97, and the diaphragm then instantly moves all the way down, putting device S in down condition and closing port 7, which cuts off the pressure supply going to the passage 22 which is holding device M in up condition and opens the exhaust port 8 therefrom; and valve device M being in up condition, the apparatus 18 exhausts through port 2 of device M, passageway 22 and port 8 of device S.

Even if the devices A and C are now operated by closing the contactor 124 and device C moves to down condition closing the port 91 by the ball 92, thereby cutting off pressure from the control conduit 55 which signaled the device S to go to up condition, the device S will remain in down condition; because, pressure will continue to be supplied unrestrictedly to the chamber 67 by the duct 72, and its only exhaust is the restricted exhaust through conduit 74.

It is repeated here that the pressure in upper chamber 67 acts on a greater effective area of the diaphragm 66 than the pressure in chamber 68, because a part of the area of the underside of the diaphragm is occupied by the upper end of the stem 11 attached to it.

Device S is also maintained in its down condition by the air pressure in chamber 68 on the top of valve 9.

Again, when the devices A and C are energized by closing of contactor 124, to signal device M to go to up condition and give pressure to the apparatus 18, they are intended to both operate and go to down condition simultaneously. If device C should operate normally, but device A should fail to operate and remain in up condition, the device M will remain in down condition due to equal pressures in its chambers 27 and 28 effected at device A as described so that safety is inherent upon this failure of device A.

Again, when the devices A and C are energized to operate, device A may operate and go to down condition but device C may fail and not operate, and remain in up condition.

In such event, operation of device A to down condition will cause device M to go to up condition as described and give pressure to the apparatus 18.

Immediately, pressure is communicated from the passageway 22 or chamber 78 of device M, by control conduit 55, port 109, chamber 105, conduit 93, to port 91 of device C; and device C being abnormally in up condition, the pressure raises the ball 92 and goes by conduit 97 to chamber 67 of device S, with the result above described of restoring device S to down condition and exhausting the apparatus 18 through port 2 of device M, passageway 22, and port 8 of device S. Pressure is thereby exhausted from the passageway 22 and lower chamber 78 of device M, and since the latter was holding device M in up condition, it restores to down condition and maintains exhaust of the apparatus 18 at the lower port 3 and outlet 23.

This restores device M downwardly, and closing of its port 2, cuts off pressure from the conduit 55, so that it is no longer supplied, as described, to the upper chamber 68 of device S, however, device S is held in the down condition as follows.

The device S went to down condition because of pressure in its upper chamber 67 supplied by conduit 74 at a greater rate than that at which it exhausted therefrom at the flow restricting valve 108.

The duct 72 alone, in the down condition of device S, supplies pressure to its upper chamber, at a greater rate than exhaust by conduit 74 and restricted valve outlet 108, and once pressure is established in chamber 67 it is maintained by the duct 72.

So long as supply pressure is maintained in the lower chamber 68 of device S, supplying the duct 72, the device S will remain in down condition.

Thus until the fault in device C is corrected, the apparatus 18 remains exhausted and cannot again be given pressure.

Again, with device M in down condition ready to be signaled to go to up condition to give pressure to the apparatus 18, by simultaneous operation of devices A and C to down condition, if both devices should fail to operate, device M will remain in down condition because of the failure of device A, and safety is inherent upon this failure.

Again, after normal operation of both devices A and C to down condition by closing of contactor 124, and with device M in up condition giving pressure to the apparatus 18, if the devices A and C are deenergized by opening of contactor 124 to go to up condition to cause device M to go to down condition and exhaust the apparatus 18, and device C goes to up condition but device A fails to do so, device M may momentarily remain in up condition due to failure of device A, but pressure is being communicated from the chamber 78 of device M, to pocket 51 and control conduit 55, and thence by conduit 93 to the check valve ball 92, and when the device C goes to up condition the pressure raises the ball 92, and goes by conduit 97 to chamber 67 of device S with the above described result of causing device S to go to down condition and stay in down condition, and safely exhaust the apparatus 18; and the device S thereby cuts off pressure from the passageway 22 and chamber 78 of device M, and it also goes to down condition. Pressure cannot again be supplied to the apparatus 18 until the fault of the device A is corrected.

Again, both devices A and C may go normally to down condition upon closing of contactor 124 and device M signaled thereby may go normally to up condition giving pressure to the apparatus 18. The devices A and C may then be deenergized by opening of contactor 124 to go to up condition, and device A may do so, but device C may, due to some fault, fail to do so, and remain in down condition.

In such event when device A went to up condition, device M went to down condition and exhausted the apparatus 18 as described, and this is a safe result. But it is not safe to leave the device C in a faulty condition; and correction of the fault of device C is made compulsory as follows.

Devices A and C both go to down condition when energized and device C holds port 91 closed, and device M goes to the up condition; and the control conduit 55 is subjected to pressure from the passageway 22, or chamber 78 of device M through the open port 2 and pocket 51.

This pressure in control conduit 55 is communicated through the check valve 110 to lower chamber 105 of device B and to conduit 93 where it is blocked off by check valve 92 at port 91 of device C.

The pressure in control conduit 55 is also communicated to the upper chamber 104 of device B by conduit 111.

When devices A and C are deenergized to go to up condition, and device A does so but device C does not, device A causes device M to go to down condition, and device M by closing its port 2, cuts off pressure from the control conduit 55.

The pressure in chamber 105 of device B is trapped therein by check valves 110 and 92, the latter being held down by failure of device C to go to up condition; but the pressure in chamber 104 of device B now exhausts to atmospheric pressure back by conduits 111 and 55 to pocket 51 of device M, through the said slit 63 under the valve 4 and down through the spool 34 and out at port 3.

The pressure in lower chamber 105 of device B predominating over that in chamber 104, the diaphragm 103 is moved up, causing the head 116 to raise the check ball 114 and open the port 113.

Pressure from the lower chamber 68 of device S, which is supply pressure, is then communicated by conduit 75 to chamber 112 of device B, through now open port 113, to chamber 101 and by conduit 74 to upper chamber 67 of device S, which restores device S to down condition, and it is maintained down by the pressure supplied by conduits 74, 75 and duct 72 at a greater rate than the exhaust by restricted outlet valve 108.

If the fault in device C is not corrected before device S is caused to be returned to its up condition in the aforedescribed manner, the device M may be operated safely to supply pressure to apparatus 18 by closing contactor 124. However, when contactor 124 is again opened, device M will trip out in the same manner as described above. Device S will continue to trip out after every operation of device M until the fault in device C is corrected.

Again, it is vital that when device M is restored to down condition, the valve 4 must close and seal the port 2 completely, and cut off all pressure from the apparatus 18.

It has been found that in spite of care in manufacture and assembly, extraneous matter, for example a chip of metal or dirt in the air from the supply, may become lodged between the valve 4 and its seat 38, and hold the port partly open.

This might cause abnormal unsafe operation of the apparatus 18, in the absence of countervailing provision, but is prevented from doing so as follows.

When the devices A and C go up and signal the device M to go down, it goes down but is stopped partly open. With device M partly open, valve 5 partly opens port 3 so apparatus 18 can be exhausted through it.

With the valve 4 held slightly above its seat 38, air under pressure from the passageway 22 or chamber 78 has a flow path inwardly radially under the valve, and down through the passages 49—50 of the spool 34, and out at the port 3; but part of it in flowing inwardly flows over the top of the pocket 51 and thence through the slit 63, Fig. 8, and then down through the spool.

As described, this flow is directed into the narrow parts a of the slit 63, Fig. 9, and restricted and retarded thereby which causes the flow over the top of the pocket 51 to be diverted under pressure downwardly into the pocket and thence to the control conduit 55 and conduit 93.

It has been described how pressure in the control conduits 55 and 93, when the check valve 92 is released will cause the device S to go to down condition and cut off the source pressure; and how the device S when it has once gone down, will stay down. Thus the failure of valve 4 to completely seal on closing its port, will prevent the device M from again being operated until the fault is corrected.

Again, in normal operation, the devices A and C when energized to operate to down condition, will do so simultaneously, and in the same short time interval. If the device A alone should for some reason be delayed in operation, the fault will have no effect, except to delay operation of device M.

If however, operation of the device A to down condition is not delayed, but operation of the device C is delayed, or if both devices delay and device C delays more than device A, then, during such delay, the valve device A will be in down condition, while the valve device C is in up condition, introducing an interval during which the port 91 is not held closed by the check valve 92.

Momentarily therefore, during the delay of device C, the circumstances will be the same as if device C failed to operate at all, with the results above described, of causing device S to go to down condition and cut off the source pressure.

The intended operations of the valve apparatus of Fig. 1 would thus, in the absence of countervailing means, be rendered irregular and unstable because of delay in operation of device C.

This is corrected in the apparatus of Fig. 1 by controlling the effective size of the conduit 74 by the adjustable needle valve 108. When the device C is not holding the port 91 closed by the check valve 92, air under pressure flows through the port as described and accumulates in the chamber 67 of device S, and the rate at which it accumulates and the time required for it to be great enough to cause device S to go down, can be made long enough, by adjusting the valve 108, so that the device C will come to down condition at the end of its delay, before the device S goes down.

As soon as device C operates fully to down condition, and no more pressure is communicated through it to the upper chamber 67 of device S, the upper chamber 67 will exhaust at conduit 74 and the device S will remain in up condition.

In practice, the valve 108 may be omitted and the rate of flow through the conduit 74 may be predetermined for the described purposes, by making the outlet opening 107 of suitable size.

Again, the exhaust outlet 23 of device M may be threaded as shown whereby the exhaust discharge may be conducted by a pipe to a point remote from the valve apparatus; and in such cases the exhaust pipe may, by carelessness or inadvertence, become obstructed and prevent free exhaust. Free exhaust of the apparatus 18 is vital to safe operation thereof.

In a case of obstructing free exhaust in this manner, the device M is in down condition, with port 2 closed by the valve 4.

Pressure that was in the pocket 51 and conduit 55 cannot now exhaust freely down through the spool and out at the outlet 23 as under normal conditions, because the exhaust is obstructed, and the interior of the spool 34 is maintained under pressure from the apparatus 18.

Devices A and C are at this time in normal up condition, having been signalled to that condition when device M was signalled to go normally to its down or exhaust condition.

It has already been described how, with device C in normal up condition, relieving the check valve 92, pressure in control conduit 55 backed by pressure in pocket 51 and spool 34 will cause device S to go to down condition and stay down; and this will now occur and the device S will cut off supply pressure at the valve 9.

It will be understood that in this instance and others above described when the device S has gone to down condition, it will stay down and cannot be operated to up condition again for further use of the valve apparatus, so long as source pressure is maintained in the lower chamber 68 and supplies source pressure to the duct 72 and upper chamber 67. To restore the valve apparatus to use, the source pressure must be cut off by closing supply valve 15; and the fault must be corrected; and then the source pressure applied again by opening the supply valve 15.

As will be apparent the source pressure must be maintained cut off in such cases, long enough to allow pressure in the upper chamber 67 of device S to exhaust, otherwise when the supply pressure is again applied, the device S will remain in down condition.

The valve device M is shown and described as having a spring 81 to move its valve parts to down condition; but such a spring is not essential to satisfactory operation. The valve parts will go to down condition by the action of gravity thereon without the spring.

However, it is preferable to utilize the spring to augment the action of gravity, and to compensate for friction which might retard the movement of the valve parts if the device M were inadvertently installed with the axis of the valve parts at an angle to the vertical.

Subject matter illustrated and described and claimed herein is illustrated and described but not claimed in applicant's prior copending application, Serial No. 570,050, filed March 7, 1956 and which issued into U. S. Patent Number 2,878,832 on March 24, 1959.

1. A valve device comprising first and second air pressure chambers and a movable wall between them, reciprocable by difference of pressure in the chambers, and connected to first and second main valves, to reciprocate the valves to first and second positions; first and second valve parts disposed to be opened and closed respectively by the main valves upon reciprocation to the first position, and closed and opened respectively by the main valves upon reciprocation to the second position; spring means normally counterbalancing the weight of the main valves and biasing them toward said first position; a permanently open restricted exhaust outlet from the second chamber; means for communicating air pressure from an air pressure source to the first chamber and to a portion of the movable wall and supplementing the biasing spring and holding the main valves reciprocated to said first position; an actuable control valve device comprising a port, and a port valve operable to hold the port closed when the control valve device is actuated; a control air conduit, having conduit communication with the second chamber through the port of the control valve device, control means for actuating the control valve device to operate the valve to hold the port closed, and the pressure in the control conduit being communicated to the second chamber and to a greater portion of the area of the movable wall, through the port of the control valve device, upon failure of the control valve device to operate and hold the port closed when actuated, to cause pressure in the second chamber to reciprocate the movable wall and initiate movement of the main valves toward said second position; duct means arranged to communicate source pressure to the second chamber; and a duct valve operable to close the duct by movement of the main valves to said second position, and operable to open the duct valve by said initiated movement of the main valves to render said duct communication effective and complete the movement of the main valves to said second positions.

2. A valve device as described in claim 1 and in which, the permanently open exhaust outlet from the second chamber is restricted to a predetermined degree to delay rise of pressure in the second chamber, in correspondence with any delay in the operation of the control valve device.

3. A valve device as described in claim 1 and in which the duct valve is operable to close the duct by movement of the main valves toward said first position by the biasing spring means.

4. A valve device as described in claim 1 and in which the valve of the control valve device is a check valve, and actuation of the control valve device causes it to operate to hold the check valve on the port to hold it closed; and pressure in the control conduit moves the check valve from the port to open it, upon failure of operation of the control valve device when actuated.

5. In a valve apparatus, a first and second main valve device each comprising housing walls with an inlet opening, an outlet opening and an exhaust opening therethrough; the inlet opening of the first device constructed to be conduit-connected to a supply of air pressure, the outlet opening of the first device communicating with the inlet opening of the second device, and the outlet opening of the second device constructed to be conduit-connected to a work apparatus; each device having a pair of valves reciprocable in unison with each other, and each of the four valves having a port controlled thereby; the valves, and their ports, and the inlet, outlet and exhaust openings of the devices arranged so that when the pair of valves of each device are reciprocated in a respective first direction, one valve of each pair closes a corresponding port and thereby the exhaust openings are cut off; and the other valves of each pair open their ports, and air may flow from the supply in at the inlet of the first device and through the said other port of the second device and out at its outlet to the work apparatus; and so that when the pair of valves of either device is reciprocated in a respective second direction, the said one valve of the pair opens its port, and air from the work apparatus may flow back in at the outlet of the second device and through the said opened port and out at the now open outlet, which had previously been cut off by the said one valve.

6. A valve apparatus as described in claim 5 and in which means is provided whereby the valves of the first valve device are normally subjected to source pressure to hold them reciprocated in the said first reciprocating direction; and spring means is provided constraining the valves of the second valve device to tend to move in said second reciprocatory direction and the valves of the second valve device are held in said first reciprocatory direction against constraint of the spring means by pressure responsive means actuated by supply pressure communicated through an open valve port of the first device in said first reciprocatory direction; and operable control means is provided controlling the said pressure responsive means to render it ineffective and to render the spring means effective to allow the valves of the second device to be moved in the second reciprocatory direction; and automatic control means is provided to apply supply pressure to the valves of the first device to move the said valves of the first device in the second reciprocatory direction responsive to failure of the valves of the second device to move in the second reciprocatory direction.

7. A valve apparatus comprising a walled housing having inlet, outlet, and exhaust orifices through the housing wall; a first and second main valve device in the housing each having an upper and lower pressure chamber and a movable wall between the chambers reciprocable up and down and each device having a pair of upper and lower valves and each pair connected to a respective movable wall and reciprocable in unison with the respective movable walls, and each device having upper and lower ports for the valves; the first and second main valve devices being disposed in series in the order named between a source of air pressure and an apparatus to be served by the air pressure; the ports and valves and orifices being arranged so that upon up movement of the pairs of valves of both main devices the valves are in so-called up condition and air under pressure may flow from the source through the inlet orifice and through the upper port of the first device, and through a port of the housing and through the upper port of the second device and out at the outlet orifice to the apparatus to be served so that upon down movement of the pair of valves of either the first or second main device the valves are in so-called down condition and air under pressure at the served apparatus may flow back through the outlet orifice through the lower port of the second device or through the upper port of the second device and the lower port of the first device and in either case exhaust through an exhaust outlet; the valves of the second device being biased toward down condition and the valves of the first device being biased toward up condition; means subjecting the lower chamber of the second main device to source pressure for moving the valves thereof to up condition to open the upper valve port of the second device and when in up condition subjecting the open upper port to source pressure; a first manually operable valve device conduit-connected between the respective chambers of the second main device and when operated exhausting pressure from the upper chamber, and when restored equalizing pressure in the upper and lower chambers and thereby allowing the biased valves of the second main device to go to down condition; the first main device having its lower chamber subjected to source pressure normally holding its valves in up condition augmenting the up bias of the valves; a second manually operable valve device having a conduit flow path therethrough, in which air under pressure from the open upper port of the second device flows to the upper chamber of the first main device, and which second manually operable device when operated prevents flow through the flow path, whereby when both manually operable devices are operated, the valves of the second main device go to up condition and the valves of the first main device remain in up condition, and when the manually operable devices are both restored the valves of the second main valve device normally go to down condition and close the upper port of the second device cutting off flow to said flow path; and whereby in the event that both manually operable devices are restored but the valves of the second main device fail to go to down condition, leaving the upper port of the second device open or partly open, the second manually operable device passes air pressure flow from the open port of the second main device through the said flow path to the upper chamber of the first main device, to cause its valves to go to down condition, and wherein a duct is provided for communicating source pressure to the upper chamber of the first device, and the duct has a valve movable to close the duct by means communicating to the valve, movement of the valves of the first device to up condition and movable to open duct by means communicating to the valve, movement of the valves of the first device toward down condition upon initiation of said movement; and the pressure in the said flow path through the second manually operable device to the upper chamber of the first device initiates down movement of the valves of the first device and pressure through the duct then augments the flow path pressure, insuring quick down movement of the valves of the first device and maintenance thereof in down condition thereafter.

8. An apparatus as described in claim 7 and in which there is also provided a pressure operable auxiliary valve device comprising a movable wall between a pair of upper and lower pressure chambers, and a normally closed valve operable to be opened by upward movement of the movable wall; and conduits communicating pressure at the upper port of the second main device when the port is open directly to the upper pressure chamber; and to the lower chamber of the auxiliary device through a check valve in the line of said flow path to the second manually operable device; and conduits communicating source pressure to the upper chamber of the first main device through the normally closed valve of the pressure operable auxiliary device; when the normally closed valve is open wherein in the event that the first manually operable device restores and as aforesaid equalizes the pressure in the chambers of the second main device and the second main device accordingly restores and as aforesaid its valves move to down condition and close the upper port, and open its lower port cutting off upper port pressure from the upper chamber of the pressure operated auxiliary device, and permitting it to exhaust through the open lower port, but the second manually operable device fails to restore, the check valve of the second manually operable device retains pressure in the lower chamber of the auxiliary device and the pressure in the upper chamber of the auxiliary device being the normally closed valve of the pressure operable auxiliary device is opened by upward movement of the movable wall and air passes therethrough from the source to the upper chamber of the first main valve device and causes the valves of the latter to go to down condition.

9. An apparatus as described in claim 7 and in which the said upper port of the second main device is circumscribed by a planar valve seat upon which the upper valve of the second device engages to close the port; and the said flow path communicates with the pressure at the upper port of the second device as aforesaid by means of a walled pocket circumscribing the valve seat and having an open upper end spaced from the plane of the valve seat; whereby when the upper valve of the second main valve device fails to go all the way to down condition but is stopped short of full engagement with the valve seat, air under pressure going to the upper port of the second device as aforesaid may flow inwardly over the valve seat and into the pocket.

10. An apparatus as described in claim 9 and in which means is provided inwardly beyond the pocket restricting said inward flow over the valve seat and deflecting some of said inward flow into the pocket.

11. An apparatus as described in claim 10 and in which, the said open upper end of the pocket is disposed so that in the event that the valves of the second valve device do go all the way to down condition closing the upper port and opening the lower port to exhaust, but free flow of exhaust through the lower port from the served apparatus as aforesaid is prevented by some extraneous obstruction and exhaust pressure accordingly develops in the upper port, exhaust pressure may flow into said pocket and thence into the flow path.

12. A valve device comprising a walled housing, having a generally cylindrical bore therein; the housing walls formed to provide an air pressure chamber at one end of the bore, an end outlet from the other end of the bore, and a side opening from an intermediate part of the bore; a one piece valve spool in the bore, comprising opposite axially spaced annular heads with annular valve seats thereon providing first and second valve ports communicating with the air chamber and end outlet respectively; and comprising an axially extending generally tubular side wall connecting the heads; and comprising axially spaced circular flanges of larger diameter than the side wall fitted in the housing bore, providing an annular passageway within the housing bore around the outside of the tubular side wall and communicating with the side opening; and comprising a generally tubular axially extending valve stem guide inside of the tubular wall, connected to the side wall and heads by connecting wall portions; the connecting wall portions formed to provide a walled pocket open toward the first port and closed axially inwardly of the first port; a recess in the bore wall opposite the pocket and an aperture communicating between the recess and the pocket interior; the said connecting wall portions formed to provide air flow paths between the annular passageway and both ports, and from the first port to the pocket interior; a valve stem reciprocable in the stem guide, and valves on the opposite ends of the stem, engageable with the valve seats upon reciprocation of the stem.

13. A walled housing formed to provide a generally cylindrical bore communicating at one end with a fluid pressure chamber, and at the other end with an end outlet and at an intermediate portion with a side outlet; a spool comprising axially spaced flanges fitted in the bore at opposite sides of the side outlet and a generally tubular wall between the flanges of smaller diameter than the flanges providing an annular passageway around the outside of the tubular wall communicating with the side outlet; the spool, axially outwardly of the flanges, having a first and second port communicating respectively between the inside of the tubular wall and the pressure chamber, and between the inside of the tubular wall and the end outlet; an opening in the tubular side wall effecting communication between the annular passageway and both ports; a walled pocket open toward the first port, and closed axially inwardly of the first port; a recess in the cylindrical bore; a walled opening in sealed communication between the pocket interior and the recess.

14. In a valve construction, a housing providing upper and lower pressure chambers with a movable wall therebetween and a valve stem connected to the wall; a duct communicating between the chambers; a duct valve to close and open the duct responsive to movement of the stem upwardly and downwardly; spring means constraining the stem to move upwardly and effect closing of the duct; means to communicate source pressure to the lower chamber to augment the spring force to hold the valve stem in an upper position; operable means to communicate pressure to the upper chamber to move the stem downwardly and effect opening of the duct; and source pressure in the lower chamber then flowing through the duct to the upper chamber to augment the pressure therein.

15. A valve device comprising first and second air pressure chambers, and a reciprocable wall between them connected to a valve, and a port for the valve; the valve being reciprocable by the wall to port open and closed positions, and spring means constraining it to go to port closed position; an air pressure conduit path from a source of pressure to the port and to one of the pressure chambers; and the pressure in the chamber tending to move the valve to open the port against the spring force; operable means controlling the pressure in the other chamber to render the spring means effective to close the port; valve means in the conduit path; and operating means operating the said valve means to cause it to cut off pressure to the port and means causing the operating means to respond automatically to failure of the port to close upon operation of the said operable means.

References Cited in the file of this patent

UNITED STATES PATENTS

| | | |
|---|---|---|
| 2,617,444 | Gardner | Nov. 11, 1952 |
| 2,636,581 | Bitler | Apr. 28, 1953 |
| 2,711,757 | Gardner | June 28, 1955 |
| 2,740,604 | Swigart | Apr. 3, 1956 |
| 2,754,840 | Hicks | July 17, 1956 |